Sept. 7, 1954
C. T. GILLIAM
2,688,376
AIR SCRUBBER
Filed Oct. 27, 1951
2 Sheets-Sheet 1
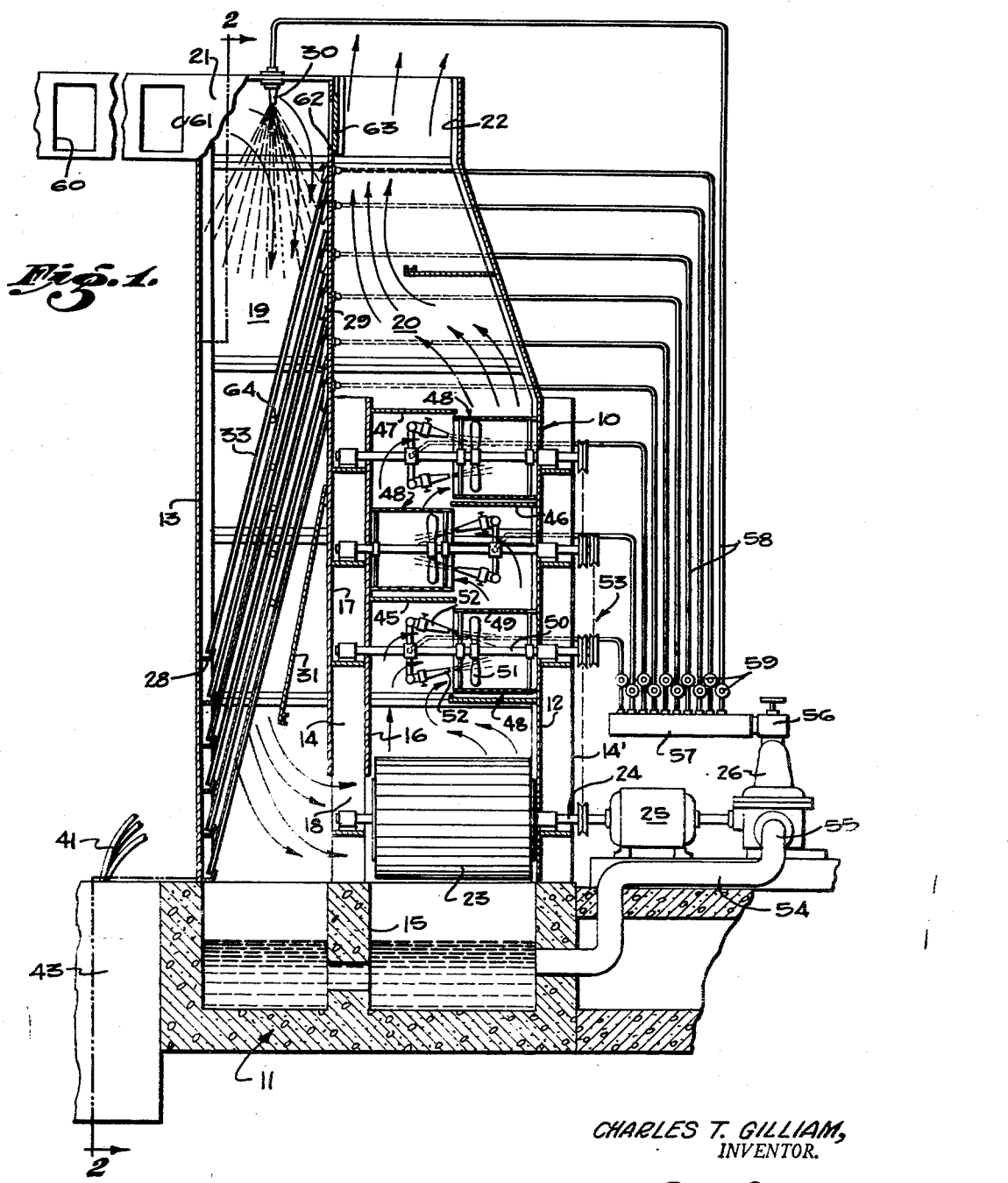
CHARLES T. GILLIAM,
INVENTOR.
BY
ATTORNEY Sept. 7, 1954     C. T. GILLIAM     2,688,376
AIR SCRUBBER
Filed Oct. 27, 1951     2 Sheets-Sheet 2
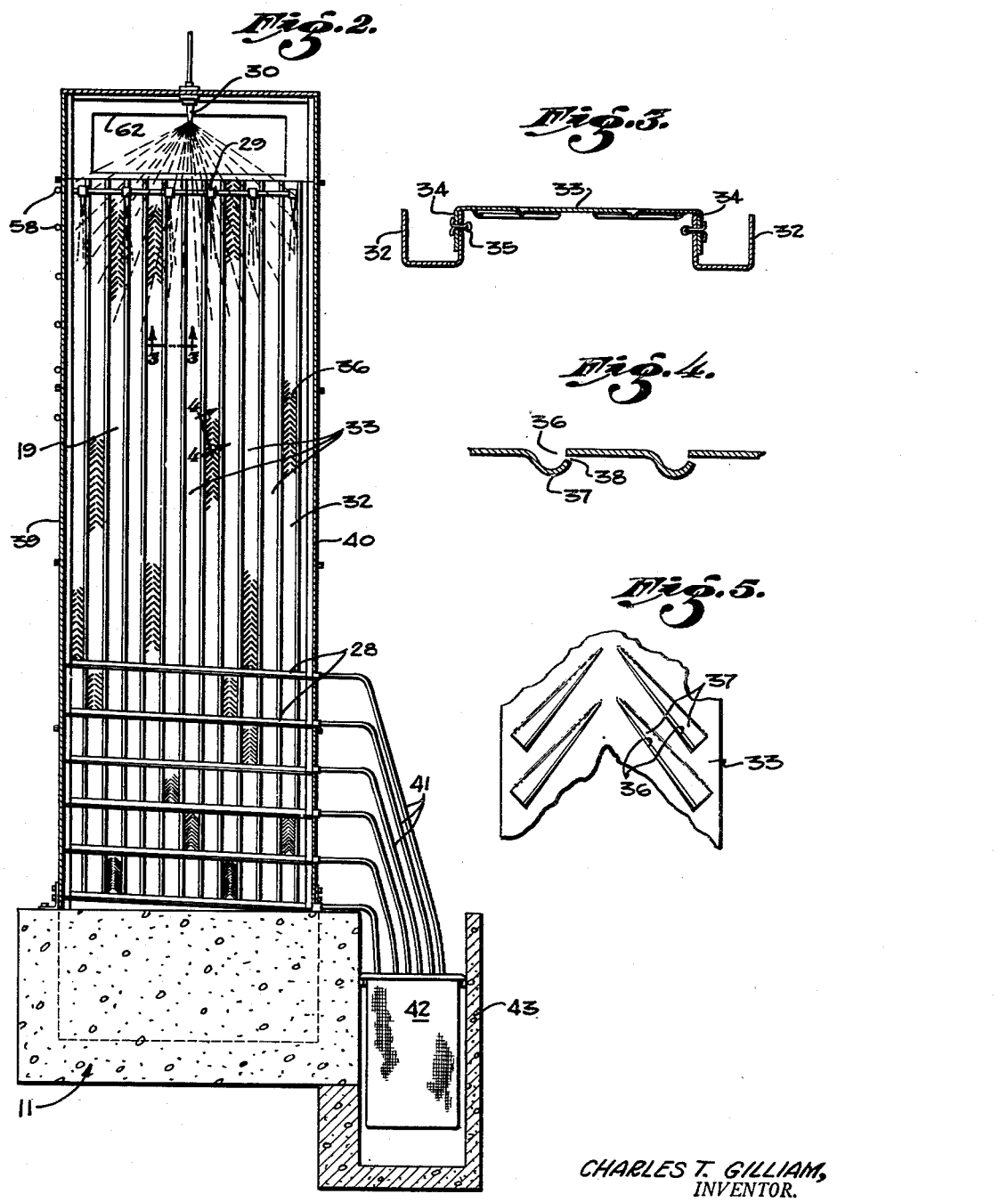
CHARLES T. GILLIAM,
INVENTOR.
ATTORNEY

Patented Sept. 7, 1954

2,688,376

UNITED STATES PATENT OFFICE 2,688,376

AIR SCRUBBER

Charles T. Gilliam, Altadena, Calif., assignor to Daniel T. Oertel, Los Angeles, Calif.

Application October 27, 1951, Serial No. 253,514

1 Claim. (Cl. 183—10)

The present invention relates generally to apparatus for the cleaning of air laden with foreign particles, and is more particularly concerned with apparatus conventionally known as an air scrubber. Such apparatus is especially useful for cleaning stack, cupola, incinerator, and the like emissions in the prevention of air pollution.

It is one object of the herein described invention to provide apparatus wherein full utilization is made of the three known methods of removing particulate matter from polluted air, namely, by filtering, impingement and centrifugal force.

A further object is to provide an air scrubber apparatus which is compact, economical of construction, efficient in operation, and contains cleaning instrumentalities which may be readily adjusted for varied conditions of operation.

A further object is to provide an air scrubber having filtering and screening means of novel construction and which are arranged so as to be self-cleaning in operation. Efficient operation is thus assured at all times, and cleanout shutdown periods are eliminated.

A still further object is to provide an air scrubber having improved means for collecting and disposing of the particulate matter removed from the air.

Another object is to provide air scrubber apparatus wherein controlled amounts of outlet air may be recirculated through the apparatus.

Still another object contemplates an air scrubber having a novel arrangement of adjustable air bleeders for regulating inlet flow and pressures.

Further objects of the invention will be brought out in the following part of the specification, wherein detailed description as for the purpose of fully disclosing the invention without placing limitations thereon.

Referring to the accompanying drawings, which are for illustrative purposes only:

Fig. 1 is a vertical section through the housing of air scrubber apparatus embodying the features of the present invention, certain of the instrumentalities therein being shown in elevation;

Fig. 2 is a sectional view, taken substantially on line 2—2 of Fig. 1;

Fig. 3 is a detail sectional view through one of the impinger frames, taken substantially on line 3—3 of Fig. 2;

Fig. 4 is a detail sectional view showing details of construction of the screening vanes, taken substantially on line 4—4 of Fig. 2; and Fig. 5 is an alternative construction for the openings in the screening vanes.

Referring now generally to the drawings, for illustrative purposes, the apparatus of the present invention is disclosed as comprising a generally rectangular upright housing 10 of steel plate or other suitable material for the purpose intended. The housing 10 is mounted upon a concrete foundation 11 which is constructed to form a vat or water basin which opens upwardly and is in communication with the lower end interior of the housing 10.

Between side walls 12 and 13 of the housing, there is positioned an upstanding framework 14 having its lowermost end anchored upon a dividing wall 15 of the foundation structure. The framework 14 provides a support for shaft bearings of certain of the cleaning instrumentalities to be hereinafter explained. The framework 14 is faced with partition forming faces 16 and 17 on its opposite sides which are terminated at their lower edges above the foundation top, in order to provide a flow passage 18 which interconnects compartments 19 and 20 lying on opposite sides of the partition and an upward extension of the wall face 17 which extends to the top of the housing. The compartments 19 and 20, as thus arranged, form in effect a U-shaped flow passage the legs of which are interconnected through the passage 18 and at their other ends communicate with an air inlet duct connection 21 and an air outlet 22 at the top of the housing.

Forced circulation of air through the housing is accomplished by means of a blower 23 carried by a shaft 24 which has its opposite ends rotatably supported in suitable bearings on the framework 14 and a similar framework 14' on the opposite side of the compartment 20. This blower is driven from a suitable power device, in this case an electric motor 25 which likewise serves as the driving medium for a water circulating pump 26 located outside of the housing 10.

The particle laden air is initially subjected to a cleaning operation in the compartment 19 in which a plurality of impinger frames 27, in this instance six in number, are arranged in parallel relation and inclined from the vertical. The lowermost ends of the impinger frames are supported in a collecting trough 28 in each case. Between the uppermost ends of the impinger frames, rows of spray nozzles 29 are provided for introducing a liquid between the impinger frames for washing their surfaces and for collecting separated particles, as well as washing the air as it moves in its passage between the impinger frames. In addition, a spray nozzle 30 is provided at the top of the compartment 19 for initially spraying water into the particle laden air as it enters the compartment. A baffle 31 separates the lowermost impinger frame from the wall face 17 and further acts to guide the water which has passed through the impinger frames so that it will fall into the water basin at the bottom of the compartment.

The impinger frames support screening structures which are successively arranged with decreasing size openings so that the uppermost screen will operate to remove the heavier particles and the finer particles will be successively removed by the screens of decreasing mesh size, the finer particles being removed by the last screen.

As shown in Fig. 2, it will be noted that the impinger frames are constructed with a plurality of parallel spaced upwardly opening channel members 32 which run lengthwise of the frame structure. Slotted vane sections 33 are supported between adjacent channels, as shown in Fig. 3, the vane sections having lateral edge flanges 34 adapted to extend over the confronting sides of the adjacent channels. Cotter pins 35 secure the flanges to the channel sides.

The vane sections contain sets of angularly positioned downwardly diverging openings 36 which are in herringbone relation and form a plurality of column assemblies between the respective channels 32 of the impinger frames.

In one form of construction, as shown in Fig. 4, the material of the vane section is punched or otherwise formed to provide an angularly extending wing 37 in each of the openings 36, this wing extending from one edge of the opening and cooperating with the other edge to form a slit 38 through which the water pressure carries the air in a deflected path. In this construction, the wing is transversely curved. With this construction, the mesh of the successive impact frame vanes may be varied by merely changing the angular position of the vane so as to form a large or narrow slit as desired.

Fig. 5 shows a modified construction in which the opening 36 is made of greater width at its lower end than at its upper end so that the wing in this case will be tapered and the slit 38 will be likewise of greater width at the bottom than the top thereof. In practice the slits are a minimum of 25% larger at the bottom than at the top. This feature results in a construction in which the slits will be self cleaning.

Referring again to Fig. 2, it will be noted that the collecting troughs 28 are of sufficient length to extend between the side walls 39 and 40 of the housing, and are respectively connected to drainage hoses 41 for conducting the collected matter into a strainer 42 which is removably mounted in a sump section 43 of the water basin.

Referring again to Fig. 1, the compartment 20 is provided with baffles 44, 45, 46 and 47 which are alternately extended in opposite directions so that the air will be forced to pass through the compartment in a tortuous zig-zag path. During the course of this movement, the air is conducted through a plurality of centrifugal separator assemblies as generally indicated by the numeral 48.

Each of the centrifugal separating assemblies comprises a rotatably mounted multi-stage screening drum 49 which is carried by a shaft 50 rotatably supported on suitable bearings on the frameworks 14 and 14'. Provision is made on the interior of the screening drums for vanes or fan blades 51 which aid in the circulation of air and prevent the formation of back pressure areas.

At the inlet end of the screening drum, nozzles 52 are positioned, these nozzles being mounted in the path of flow of air and being directed towards the interior of the drum so as to assist in further cleaning and scrubbing of the air, as well as aiding in cleaning of the screening openings of the drum. As shown, the centrifugal separator assemblies are driven by the motor 25 through a suitable power transmission connection, as generally indicated by the numeral 53, in this instance a belt and pulley arrangement.

A self-contained water circulating system is employed. The pump 26 is connected on its inlet side with the water basin by an inlet pipe 54 containing a control valve 55. On its discharge side, the pump outlet is connected through a control valve 56 with a header 57. This header is connected through necessary branch supply pipes 58 having individual control valves 59 therein with the nozzles 29, 30 and 52 in conventional manner.

In order to adapt the apparatus for different operating conditions, and assure most efficient operation, means are provided for controlling bleed connections with atmosphere and recirculation of cleaned air through the apparatus. For such purpose, a bleeder valve of suitable construction and control is provided as indicated by the numeral 60, at the end of duct 21 which connects to the stack or other supply of particle laden air. By means of this valve, a pressure differential may be properly maintained under different operating conditions between the stack emissions and entrance duct so as to assure that all emissions will be entrained in the duct, and that excess suction from the stack will not occur.

A similar bleeder valve 61 is positioned in the duct 21 adjacent the upper end of compartment 19.

Connecting the upper ends of the compartments 19 and 20, a recirculation opening 62 is provided, this opening being controlled by a slide gate valve 63.

The bleeder valve 61 permits adjustment of intake of atmospheric or ambient air and permits regulation so that the blower 24 may operate at full capacity under varied operating conditions. Also, by regulating valve 63, the amount of recirculated air may be varied, as desired.

During operation, it is contemplated that a pressure drop between the impacted frames of approximately six inches of water, will be maintained. In order to check this pressure drop, gate test openings 64 are provided, as shown in Fig. 1, through which appropriate indicating devices may be inserted between the impinger frames.

While the apparatus has been described generally as utilizing water in connection with the cleaning operations, it will be appreciated that this water may be treated and various detergents utilized, depending upon the operating conditions, so as to augment the cleaning and air scrubbing operations and reduce corrosion.

Various modifications may suggest themselves to those skilled in the art without departing from the spirit of my invention, and, hence, I do not wish to be restricted to the specific form shown or uses mentioned, except to the extent indicated in the appended claim.

I claim:

In an air scrubber; an upright compartment having an inlet at its upper end for air containing foreign matter to be removed therefrom; a plurality of parallel impinger frames inclined from the vertical at a relatively acute angle and being relatively closely spaced; surfaces presented by said frames having screening openings therein of decreasing size in the direction of flow of air therethrough, the openings in each impinger frame surface comprising a plurality of sets of elongate downwardly diverging openings arranged in columns in herringbone relation; a wing in each opening angularly extending from one edge of the opening and cooperating with another edge of the opening to define a screening slit; channels in said surfaces positioned between the lower ends of said openings; nozzles at the upper ends of said frames for spraying a liquid between the frames for washing the frame surfaces and carrying separated matter into said channels; and troughs at the bottom of said frames for collecting the matter from said channels; and means for moving the air through said compartment.

References Cited in the file of this patent

UNITED STATES PATENTS

| Number | Name | Date |
|---|---|---|
| 146,115 | Westover | Dec. 30, 1873 |
| 494,292 | Dornfeld | Mar. 28, 1893 |
| 529,625 | Lowe | Nov. 20, 1894 |
| 538,040 | Hilton | Apr. 23, 1895 |
| 999,114 | Lang | July 25, 1911 |
| 1,042,864 | Winks | Oct. 29, 1912 |
| 1,562,158 | Gersman | Nov. 17, 1925 |
| 1,673,732 | Brooks | June 12, 1928 |
| 2,086,385 | Manning et al. | July 6, 1937 |
| 2,574,848 | Schroeder | Nov. 13, 1951 |
| 2,585,440 | Collins | Feb. 12, 1952 |

FOREIGN PATENTS

| Number | Country | Date |
|---|---|---|
| 251,682 | Great Britain | May 3, 1926 |